United States Patent
Dunand et al.

[11] Patent Number: 6,044,039
[45] Date of Patent: Mar. 28, 2000

[54] GEOPHYSICAL ATTRIBUTE MIGRATION METHOD FOR A MEDIUM

[75] Inventors: Jean-Pierre Dunand, Soumoulou; Eric de Bazelaire, Lescar, both of France

[73] Assignee: Elf Exploration Production, Courbevoie, France

[21] Appl. No.: 09/043,217

[22] PCT Filed: Jul. 9, 1997

[86] PCT No.: PCT/FR97/01247

§ 371 Date: Mar. 17, 1998

§ 102(e) Date: Mar. 17, 1998

[87] PCT Pub. No.: WO98/03886

PCT Pub. Date: Jan. 29, 1998

[30] Foreign Application Priority Data

Jul. 19, 1996 [FR] France .................................. 96 09094

[51] Int. Cl.$^7$ ...................................................... G01V 1/36
[52] U.S. Cl. ................. 367/25; 367/68; 364/421
[58] Field of Search ................................ 367/47, 51, 52, 367/59, 68, 421, 53, 54, 50

[56] References Cited

U.S. PATENT DOCUMENTS 4,888,742  12/1989  Beasley ........................................ 367/53
5,530,679  6/1996  Albertin ........................................ 367/68

*Primary Examiner*—Christine Oda
*Assistant Examiner*—Anthony Jolly
*Attorney, Agent, or Firm*—Foley & Lardner

[57] ABSTRACT

A geophysical attribute migration method for a medium is disclosed. The method comprises forming at least one collection of seismic traces associated with an area of the medium and classified according to a predetermined criterion, and a stack section is produced on the basis of said seismic trace collection using a stacking speed field related to said area. According to the method:

(a) the product of a term related to the trace amplitude and a term related to the stacking speeds is determined;

(b) the amplitude data and the product are migrated at an initial migration speed to give a migrated amplitude image and a migrated product image, respectively;

(c) a ratio is established between the migrated product image data and the migrated amplitude image data to give a migrated position speed; and (d) steps (b) and (c) are iterated in such a way that the migration speed of each iteration is the same as the migrated position speed from the preceding iteration, until the deviation between the migrated position speed of the final iteration (n) and that of penultimate iteration (n−1) is below a predetermined threshold.

6 Claims, 6 Drawing Sheets

GEOPHYSICAL ATTRIBUTE MIGRATION METHOD FOR A MEDIUM

BACKGROUND OF THE INVENTION

1. Field of the Invention

The present invention concerns a method of migrating geophysical attributes of a medium and more particularly of a given area of said medium.

2. Description of the Related Art

Reflection seismic prospecting is a standard method used, in particular in petroleum exploration, to obtain a seismic image of the medium to be explored. In this method, using appropriate energy sources called emitters, acoustic waves are emitted that propagate in the medium to be explored and are reflected at the various reflectors or horizons that it contains. The reflected waves are recorded as a function of time by appropriate receivers disposed on the surface of the medium.

The records or traces are then grouped in accordance with a criterion determined in accordance with objectives to be achieved and constitute trace gathers. The common midpoint (CMP) trace gather groups the series of traces that are assigned to points midway along the straight line segments linking the emitter-receiver pairs used to obtain said traces.

Seismic processing derives from said trace gathers a seismic image in the vertical plane through the set of mid-points. If it is assumed that the medium is homogeneous and isotropic, with plane and parallel layers, the reflections of the waves at the various reflectors observed on a common mid-point trace gather are theoretically aligned with hyperbolas called indicators centred on a vertical line through the mid-point. To stack the traces of each gather, said traces are corrected dynamically using a velocity field or law $V(t)$. One way to obtain this velocity field is to carry out individual velocity analyses on a limited number of common mid-point trace gathers and then to interpolate the results of such analyses, in time, on the one hand, for each of the analyses, and in space, along the abscissa axis, on the other hand.

The standard velocity analysis consists in successively applying constant velocities to the CMP trace gathers for the selected mid-points and then stacking the dynamically corrected traces for each of the velocities used and manually selecting the velocities yielding an energy maximum of the stack trace.

In an article entitled "Normal Moveout Revisited: Inhomogeneous media and curved interfaces" published in GEOPHYSICS, Volume 53, No 2, February 1988, pages 143 through 157, Eric de Bazelaire has developed another velocity analysis method used to obtain improved stack sections known as "POLYSTACKS". Briefly, the POLYSTACK method consists in scanning all the traces of a same CMP trace gather and applying a static correction to all the traces in accordance with a family of hyperbolas independent of time and different from one stack trace to another, in order to produce "BAP", each trace of which is a stack of traces from the CMP gather corrected in this way.

Another method, more sophisticated than the "POLYSTACK" method, is described in patent application FR-A-2 726 091. This other method, known as the DELTA STACK method yields, as previously, a refined velocity field of better resolution and an improved stack section, using "BAP" of the POLYSTACK type but of smaller size.

The POLYSTACK and DELTA STACK methods both have the peculiarity of including and/or of making more accessible the geophysical attributes of the area of the medium explored, including the amplitude and velocity attributes, of course.

The stack section obtained by the various methods outlined above includes a number of anomalies (diffraction hyperbola, poor location of dipping events, etc) that have to be corrected.

When the area of the medium to be explored is isotropic, homogeneous, with plane and parallel layers, the slice or interval velocities can easily be calculated using the DIX formula well known to the skilled person.

In the case of an area comprising dipping reflectors, it is necessary to apply a correction before migration known as DMO (DIP MOVE OUT).

The stack section can be migrated in time or in depth according to the aims to be achieved, with the facility for switching from time migration to depth migration and vice versa. This is well known to the skilled person and will not be described in detail, the effect of the migration being to move the seismic event or events appearing on the stack section back straight up of their geological position.

To migrate a seismic signal it is necessary to know the distribution of velocities in the subsurface which, in geophysical terms, amounts to knowing the interval velocity field in the migrated position.

In fact, the interval velocity field is an unknown, regardless of the migration technique used: wave equation or ray tracing; it is replaced by a velocity distribution law obtained from the stack or from any other form of modelling. Any error in respect of this velocity field introduces a skew into the results of the amplitude migration in particular.

BRIEF SUMMARY OF THE INVENTION

An aim of the present invention is to propose a method for migrating the geophysical attributes of an area to be explored, or at least its geophysical attributes that are of interest in petroleum exploration.

More particularly, an object of the present invention is to determine a migrated position velocity field using migration of the amplitude attribute and using the migrated velocity field for the migration of any other geophysical attribute.

The present invention consists of a method in which:

at least one seismic trace gather is constituted from seismic traces, classified in accordance with a particular criterion and concerning said area, a stack section is produced from said seismic trace gather using a stack velocity field concerning said area, characterised in that, additionally:

a) the product of a term relating to the amplitude of the traces by a term relating to the stack velocities is effected;

b) the amplitude data is migrated with an initial migration velocity to obtain a migrated image of the amplitude and said product is migrated with said initial migration velocity to obtain a migrated image of said product, c) the ratio of the data of the migrated image of said product to the data of the migrated image of the amplitude is determined to obtain a migrated position velocity, and d) steps b) and c) are iterated using for each iteration a migration velocity equal to the migrated position velocity obtained from the immediately preceding iteration until such time as the difference between the final migrated position velocity of iteration (n) and the migrated position velocity of iteration (n−1) is below a predetermined threshold.

The present invention produces a velocity field very close to the migrated velocity field from which other geophysical attributes can be migrated correctly.

In accordance with another feature of the invention, the migration is the time migration.

In accordance with another feature of the invention, step c) is effected on the envelopes of the traces after time migration of the amplitude and the product.

In accordance with another feature of the invention, the term relating to the stack velocities is assigned an exponent less than or equal to 1.

In accordance with another feature of the invention, each of the other geophysical attributes is time migrated with the final velocity field by effecting steps a) through c) only.

In accordance with another feature of the invention, the initial migration velocity is a stacking velocity.

BRIEF DESCRIPTION OF THE DRAWINGS

Other advantages and features will emerge more clearly from a reading of one embodiment of the invention and from the accompanying drawings, in which.

DETAILED DESCRIPTION OF THE INVENTION

Figure 1:
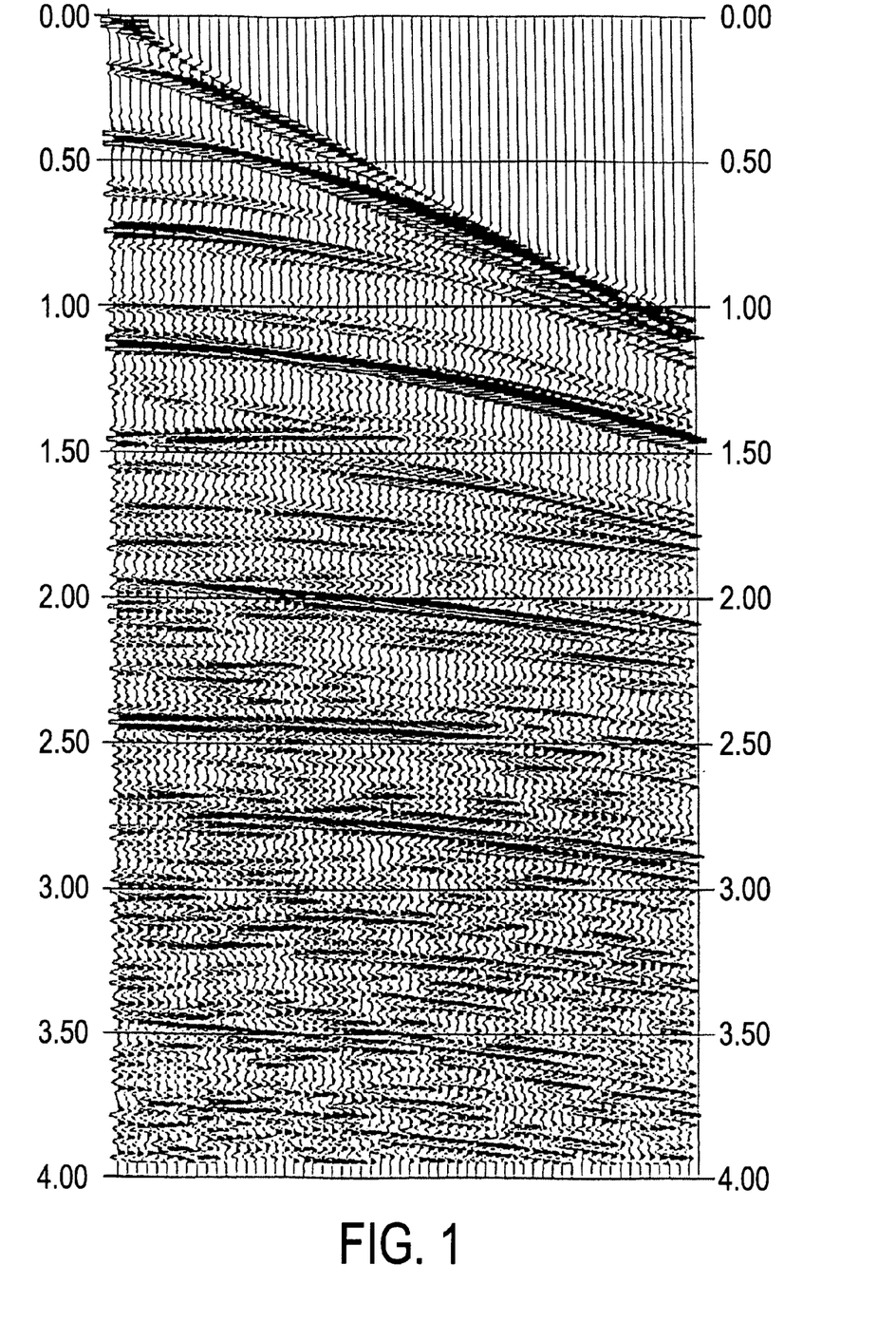
FIG. 1 is a synthetic representation of a common mid-point trace gather.

The standard techniques employed in reflection seismic prospecting are used to constitute what are known as common mid-point trace gathers. A common mid-point trace gather (CMP gather) is shown synthetically in FIG. 1 and concerns a geological area of a medium to be explored.

Figure 2:
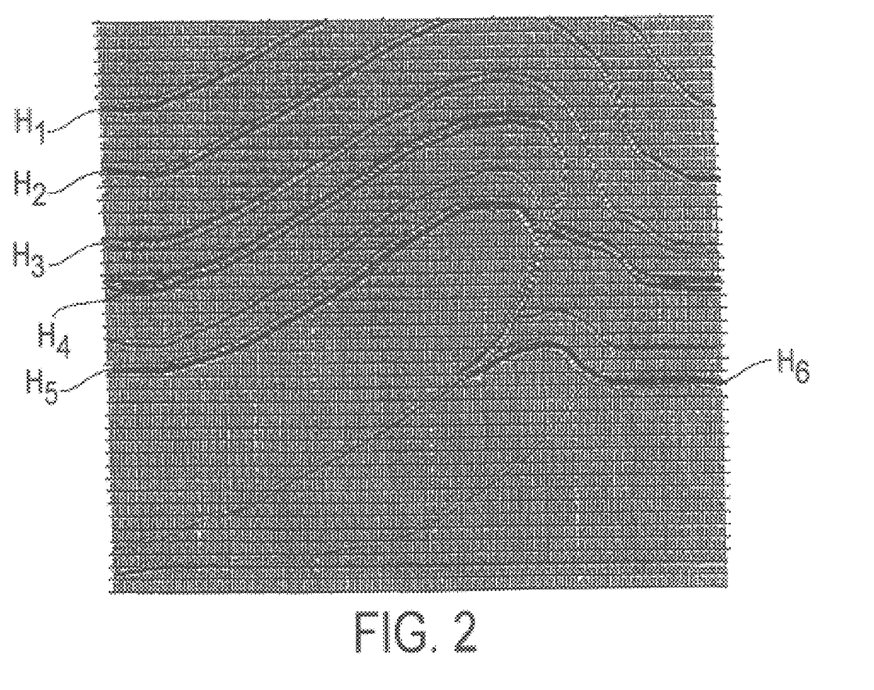
FIG. 2 is a synthetic representation of a geological model concerning an area to be explored.

The initial geological model of the zone concerned is represented synthetically in FIG. 2, the ordinate axis representing depth, whereas in the other figures the ordinate axis represents time. On the geological model, it is possible to pick a certain number of reflectors $H_1$ through $H_6$ at depths between 490 m for the reflector $H_1$ and 2 060 m for reflector $H_6$. The geological model is by its very nature almost perfect since it is produced manually by the geophysicist. On the basis of the geological model, CMP trace gathers are synthesised after which velocity analyses are carried out and the traces of the CMP gathers are summed (stacked) to obtain a sum (stack) model like that shown in FIG. 3, in which the same reflectors $H_1$ through $H_6$ are seen at the corresponding times.

Figure 3:
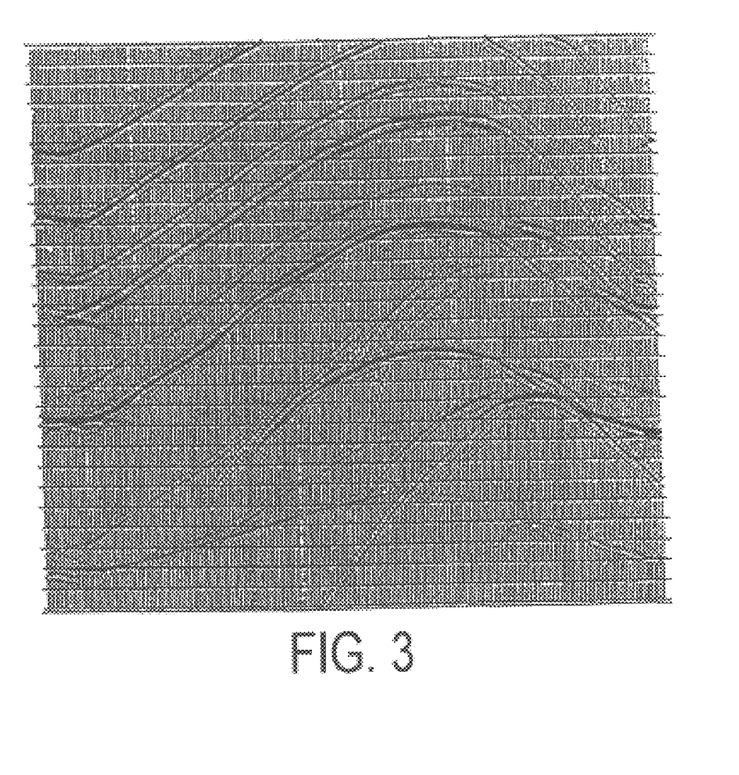
FIG. 3 is a synthetic representation of a stack model.

The stack model of FIG. 3 is representative of the stack amplitude, which is a geophysical attribute to be migrated in time, for example. To do this it is necessary to use any initial velocity field, for example the velocity field used for stacking or the velocity field obtained by the POLYSTACK or DELTA STACK methods outlined in the preamble. One initial velocity field that can be used to migrate the amplitude attribute is that shown in FIG. 4. On this velocity field there are various tone gradations that range from black to white through greys and which correspond to isovelocities with values which can be determined using the palette shown on the left in FIG. 4. Thus the greys bottom left in the figure correspond to velocities in the order of 5 000 m/s, the first white slice above the double time of 2.5 seconds corresponding to the velocity of 4 686 m/s, and so on. The abscissa axis indicates the file number of the CMP trace used to produce the model.

In a first step of the method of the invention the product of the amplitude term A and a term representative of the stack velocity V is obtained. Of course, any other combination of these terms could be used, provided that it is coherent, the product A*V being the simplest combination, but any function of A and V that can be inverted could be used to obtain the combination. In fact, this first step consists in sampling each stack trace of the stack model and obtaining the product of the amplitude of each sample by the corresponding stack velocity.

Figure 4:
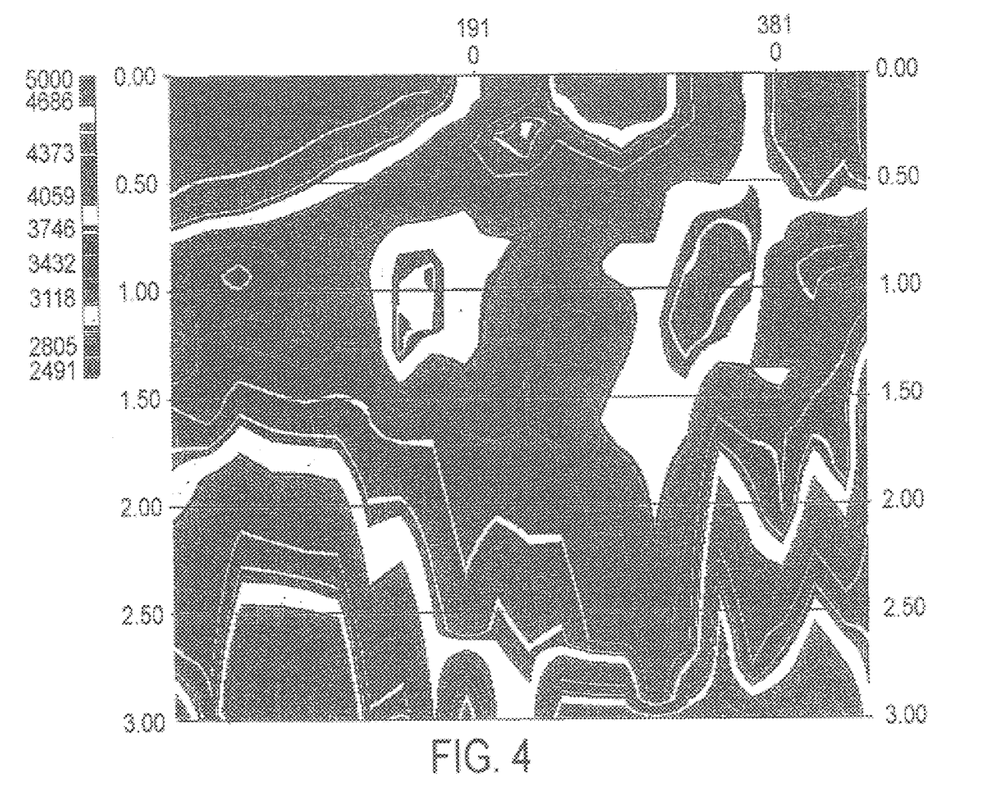
FIG. 4 is a synthetic representation of a velocity field before migration.

Because the velocity field can have a very wide spectrum, for example between 1 000 and 10 000 m/s or between 2 490 and 5 000 m/s for the velocity field from FIG. 4, the V term is weighted by an exponent $\alpha$ which is at most equal to 1, in order to attenuate the unwanted effects of migration. The exponent $\alpha$ is preferably equal to 0.5. This produces a fixed magnitude for the remainder of the process defined by the product $A^*V^\alpha$.

The second operation is to migrate the amplitude trace A and the product $A^*V^\alpha$ in the same interval velocity field derived from the initial velocity field used which, as mentioned above, can be the stack velocity field. To optimise this step it is preferable to use a KIRCHHOFF type migration in which the travel times are calculated, for example using the EIKONAL algorithm, because the calculation is the same for the two migrations A and $A^*V^\alpha$. Nevertheless, any other time migration can be used, such as wave equation migration, a technique well known to the skilled person.

The preceding time migration thus produces a time migrated image corresponding to the amplitude and a time migrated image corresponding to the product $A^*V^\alpha$.

The third step is to obtain the ratio of the migrated image $(A^*V^\alpha)$ to the migrated image A, so that a first migrated position velocity $V^\alpha$ is obtained, since:

$$\frac{\text{migrated}(A*V^\alpha)}{\text{migrated }A} = \text{migrated }V^\alpha$$

To prevent the stack amplitude trace crossing zero during migration, which is always very difficult, it is preferable to obtain the above ratio on the envelopes of the traces of the amplitude A and of the product $A*V^\alpha$ after migration.

This provides a first migrated position velocity field. However, the previous migration is imperfect in that it is obtained from a stack velocity field in a non-migrated position. Also, the present invention further consists in causing the migrated velocity field to converge by means of successive iterations.

In iteration 1, the second and third steps are repeated with the first migrated position velocity $V_1$. Thus the amplitude term A and the product $*V^\alpha$ are time migrated using the velocity $V_1$, after which the following ratio is calculated:

$$\frac{\text{migrated}(A*V^\alpha)}{\text{migrated }A} = \text{migrated }V^\alpha$$

to obtain at the end of iteration 1 a migrated position velocity $V_2$. This is shown in FIG. 5, in which long black streaks can still be seen.

Figure 5:
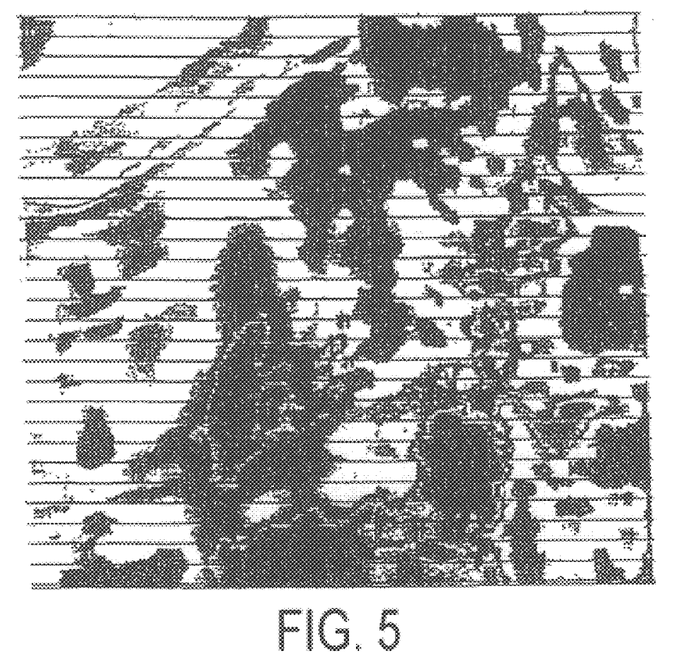
FIG. 5 is a synthetic representation of an estimate of the velocity field after the first iteration.
Figure 6:
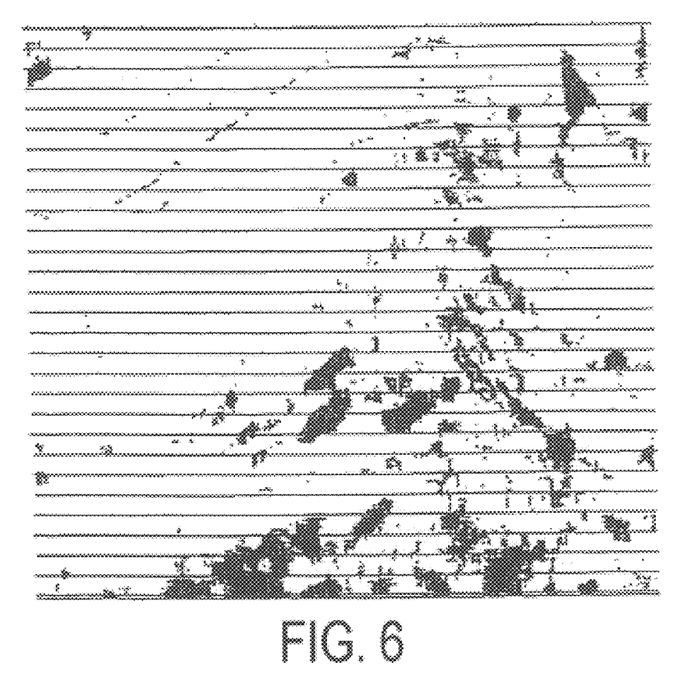
FIGS. 6 through 8 are synthetic representations of estimates of the velocity field after the second, third and fourth iterations, respectively.

In iteration 2, the migration velocity $V_2$ is used to migrate the amplitude term A and the product $A*V^\alpha$, the ratio of the two terms giving the velocity field $V_3$ obtained from iteration 2, which is shown in FIG. 6 and is significantly improved compared to FIG. 5.

Figure 7:
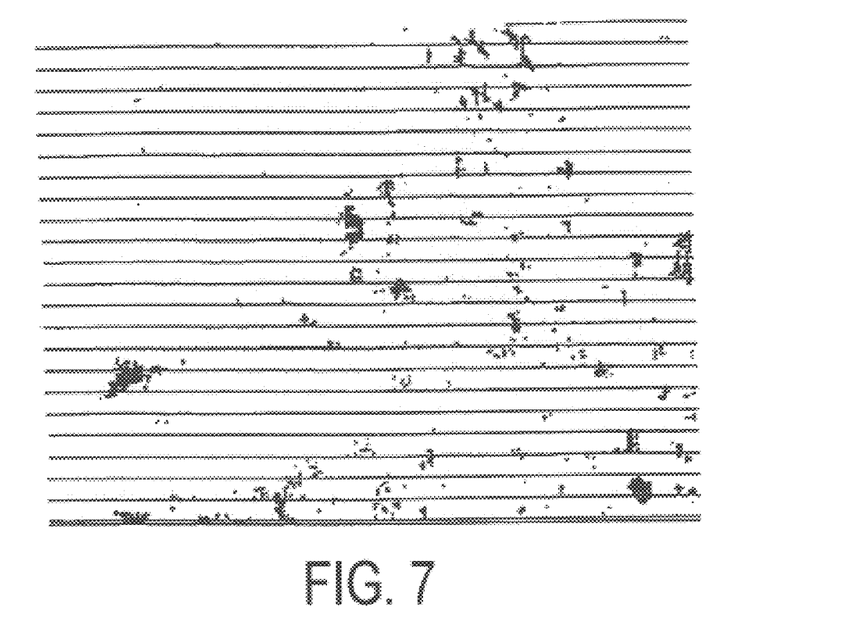

In iteration 3, the migrated position velocity $V_3$ is used as the migration velocity, the migrated velocity field obtained being shown in FIG. 7. The velocity field in FIG. 7 is converging satisfactorily.

Figure 8:
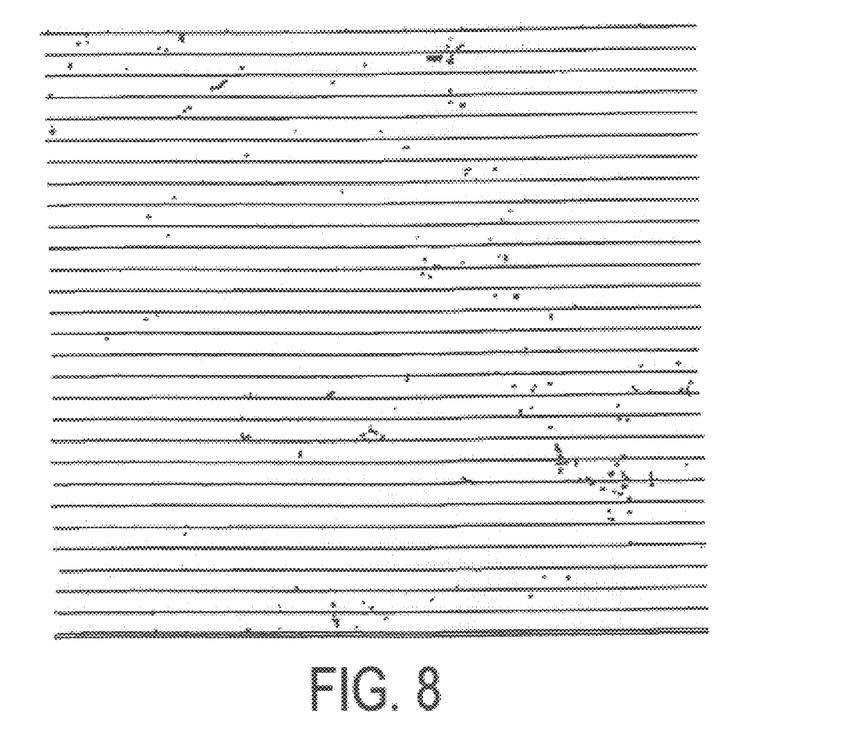

At the end of iteration 4, the corresponding velocity field, shown in FIG. 8, has converged completely, there being minimal differences between it and that of FIG. 7. At this stage there is no point in continuing the iteration since the velocity fields that could be obtained in this way would not be significantly more precise than that shown in FIG. 8. In fact, the iteration process is stopped when the difference between the migrated velocity field obtained from n-th iteration (here iteration 4) and the migrated velocity field obtained from (n–1)-th iteration (here iteration 3) is below a certain predetermined threshold, the limit being such that the conversion into interval velocities of the stack velocity field in the migrated position is identical to the interval velocity field used to effect the migration.

Note that the process converges automatically towards true interval velocity field of the subsurface of a medium in the DIX sense.

Figure 9:
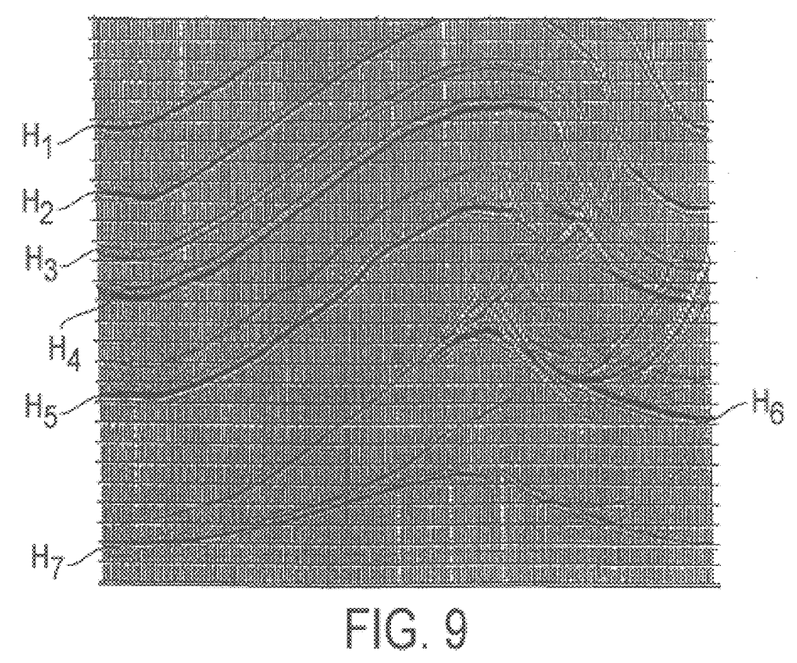
FIG. 9 is a synthetic representation of the migration of the amplitude with the velocity field from FIG. 8.
Figure 10:
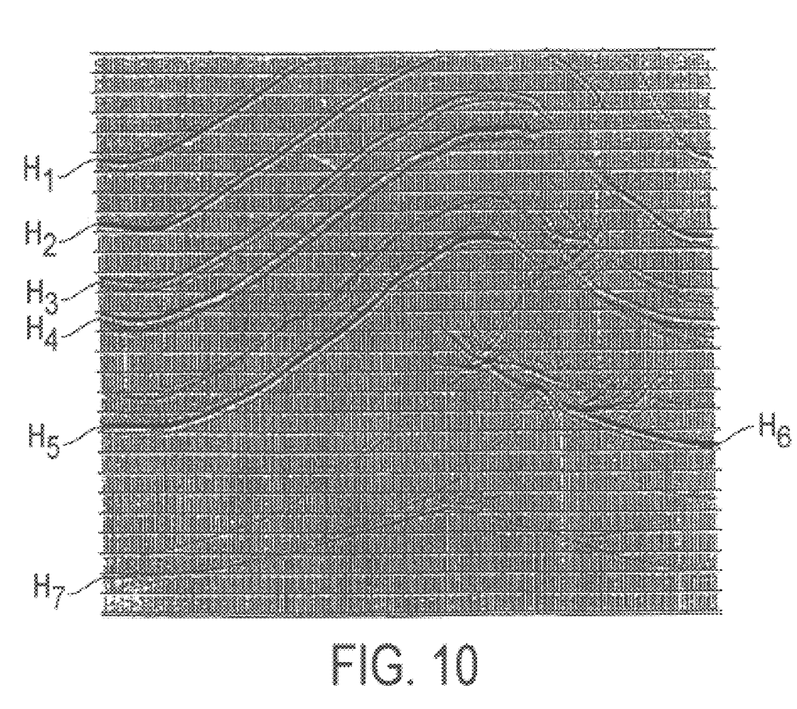
FIG. 10 is a synthetic representation of the migration of the amplitude using standard migration techniques.

FIG. 9 shows the migrated image of the amplitude with the iteration 4 velocity field. If this migrated image is compared with a migrated image of the same amplitude obtained using the prior art techniques, and shown in FIG. 10, it is readily apparent that the reflectors $H_2$ and $H_3$ of FIG. 9 are more curved beyond their summit than the same reflectors in FIG. 10, which defines the fault that is localised by the righthand ends of said reflectors better. Furthermore, the last reflector $H_7$ towards the bottom of FIGS. 9 and 10 is more marked in FIG. 9 than in FIG. 10.

The present invention also enables time migration of other geophysical attributes $A_{TT}$ such as signal/noise ratio, accuracy of curvature, etc.

Knowing the migrated position velocity field it is sufficient to effect the product $$A*A_{TT}^\alpha,$$

to time migrate the amplitude term A and the product $$A*A_{TT}^\alpha$$

with the migrated position velocity field, such as that of iteration 4 which in fact constitutes the final velocity field, and to calculate the ratio:

$$\frac{\text{migrated}(A*A_{TT}^\alpha)}{\text{migrated }A}$$

to obtain $$A_{TT}^\alpha$$

at the migrated position, with no iteration since the migration velocity field is now known.

It goes without saying that the iterative process described hereinabove converges only in the spatial band of the stack velocity field in the non-migrated position. Using an interpolated velocity field would define only the low frequencies of the actual velocity field. This is why the invention preferably uses the POLYSTACK and DELTA STACK techniques which produce amplitude and velocity sections with identical spatial bands, with the aim of obtaining POLYSTACK or DELTA STACK sections in the migrated position.

Another advantage of the present invention is that the spatial distribution of the interval velocities is known more accurately, so that it is possible to determine the true velocities in the migrated section, and a knowledge of these true velocities contributes to determining the lithology of the subsurface, for example.

What is claimed is:

1. A method of migrating geophysical attributes of an area of a medium to be explored, which comprises the steps of:
   a) obtaining at least one seismic trace gather from seismic traces, classified in accordance with a particular criterion and concerning said area;
   b) obtaining a stack section from said seismic trace gather using a stack velocity field concerning said area;
   c) determining the product of a term relating to the amplitude of the traces by a term relating to the stack velocities;
   d) migrating the amplitude data with a migration velocity to obtain a migrated image of the amplitude, and migrating said product with said migration velocity to obtain a migrated image of said product;
   e) determining the ratio of the data of the migrated image of said product to the data of the migrated image of the amplitude to obtain a migrated position velocity; and
   f) iterating steps d) and e) by using for each iteration a migration velocity equal to the migrated position velocity obtained from the immediately preceding iteration until such time as the difference between the final migrated position velocity of the n-th iteration and the migrated position velocity of (n−1)-th iteration is below a predetermined threshold.

2. The method according to claim 1, wherein the migration is a time migration.

3. The method according to claim 2, wherein step e) is performed on the envelopes of the traces of the amplitude and of said product after time migration.

4. The method according to claim 1, wherein the term relating to the stack velocities is assigned an exponent less than or equal to 1.

5. The method according to claim 2, wherein each of the other geophysical attributes $A_{TT}$ is time migrated with the final velocity field by determining the product of a term relating to the amplitude A of the traces by a term relating to the attribute $A_{TT}$, migrating the amplitude data with the final velocity field to obtain a migrated image of the amplitude, and migrating said product with said final velocity field to obtain a migrated image of said product, and determining the ratio of the data of the migrated image of said product to the data of the migrated image of the amplitude to obtain said attribute at the migrated position.

6. The method according to claim 1, wherein the migration velocity has an initial migration velocity which is a stack velocity.

* * * * *